(12) United States Patent
Carletti et al.

(10) Patent No.: US 9,190,900 B2
(45) Date of Patent: Nov. 17, 2015

(54) ACTIVE POWER FACTOR CORRECTOR CIRCUIT

(71) Applicant: Infineon Technologies AG, Neubiberg (DE)

(72) Inventors: Andrea Carletti, Munich (DE); Albino Pidutti, Villach (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 372 days.

(21) Appl. No.: 13/651,924

(22) Filed: Oct. 15, 2012

(65) Prior Publication Data

US 2014/0103861 A1  Apr. 17, 2014

(51) Int. Cl.
*H02M 1/00* (2007.01)
*H02M 1/42* (2007.01)

(52) U.S. Cl.
CPC .... *H02M 1/4225* (2013.01); *H02M 2001/0032* (2013.01); *Y02B 70/126* (2013.01); *Y02B 70/16* (2013.01)

(58) Field of Classification Search
None
See application file for complete search history.

(56) References Cited

U.S. PATENT DOCUMENTS

| | | | |
|---|---|---|---|
| 5,867,379 A * | 2/1999 | Maksimovic et al. | 363/89 |
| 7,123,494 B2 * | 10/2006 | Turchi | 363/89 |
| 7,639,520 B1 * | 12/2009 | Zansky et al. | 363/65 |
| 8,102,679 B2 | 1/2012 | Gong et al. | |
| 8,344,638 B2 * | 1/2013 | Shteynberg et al. | 315/247 |
| 8,953,348 B2 | 2/2015 | Sugawara | |
| 9,054,597 B2 | 6/2015 | Zhao et al. | |
| 2004/0264224 A1 * | 12/2004 | Jang et al. | 363/97 |
| 2010/0066337 A1 | 3/2010 | Gong et al. | |
| 2011/0075458 A1 * | 3/2011 | Phadke et al. | 363/126 |

FOREIGN PATENT DOCUMENTS

| | | |
|---|---|---|
| CN | 1917341 A | 2/2007 |
| CN | 101026316 A | 8/2007 |
| CN | 100423417 C | 10/2008 |
| CN | 102035407 A | 4/2011 |
| CN | 102594118 A | 7/2012 |
| CN | 102656787 A | 9/2012 |
| WO | 2004107546 A1 | 12/2004 |

OTHER PUBLICATIONS

Unitrode Application Note U-111, "Practical Considerations in Current Mode Power Supplies," 1999, Texas Instruments Incorporated, pp. 3-106 through 3-123.*

Todd, Phillip C., "Boost Power Factor Corrector Design with the UC3853," Unitrode Corporation, U-159, 1999, 24 pages.

Andreycak, Bill, "Power Factor Correction using the UC3852 Controlled On-Time Zero Current Switching Technique," U-132, Unitrode Corpration, 1999, 17 pages.

(Continued)

*Primary Examiner* — Leigh Garbowski
(74) *Attorney, Agent, or Firm* — Slater & Matsil, L.L.P.

(57) ABSTRACT

In accordance with an embodiment, an electronic device includes a controller configured to be coupled to a first switch of a power factor corrector. The controller is configured to produce a variable switching frequency depending on a load current. For a first load current, the controller is configured to produce a first switching frequency, and for a second load current, the controller is configured to produce a second switching frequency.

26 Claims, 14 Drawing Sheets

(56) References Cited

OTHER PUBLICATIONS

Todd, Phillip C., "UC3854 Controlled Power Factor Correction Circuit Design," Unitrode Application Note, U-134, 1999, 21 pages.
Andreycak, Bill, "Optimizing Performance in UC3854 Power Factor Correction Applications," Unitrode Design Note, DN-39E, 1999, 6 pages.
Noon, James P., "Designing High-Power factor Off-Line Power Supplies," Texas Instruments Incorporated, 2003, 36 pages.
Cohen, Isaac et al., "High Power Factor and High Efficiency—You Can Have Both," Texas Instruments Incorporated, 2008, 13 pages.

* cited by examiner

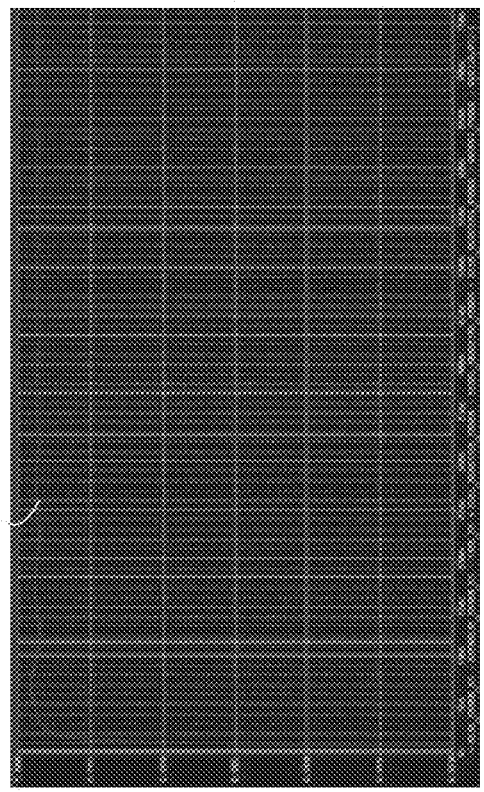
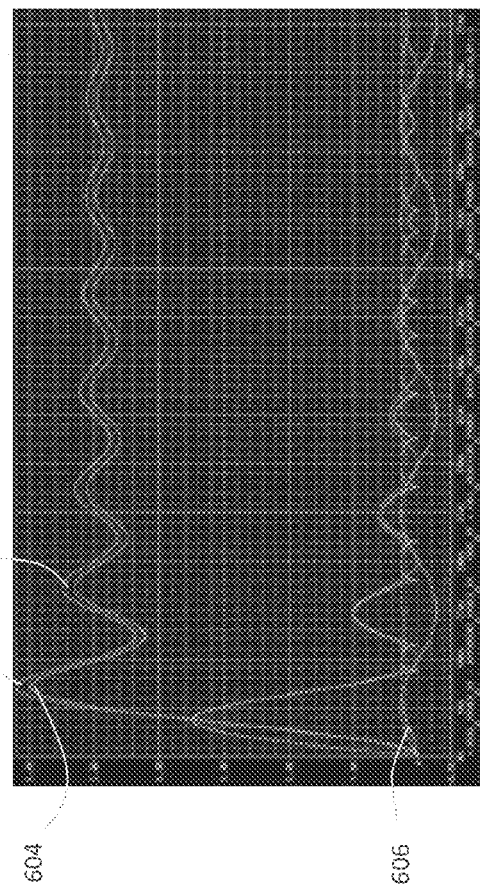
Figure 6a
Figure 6b

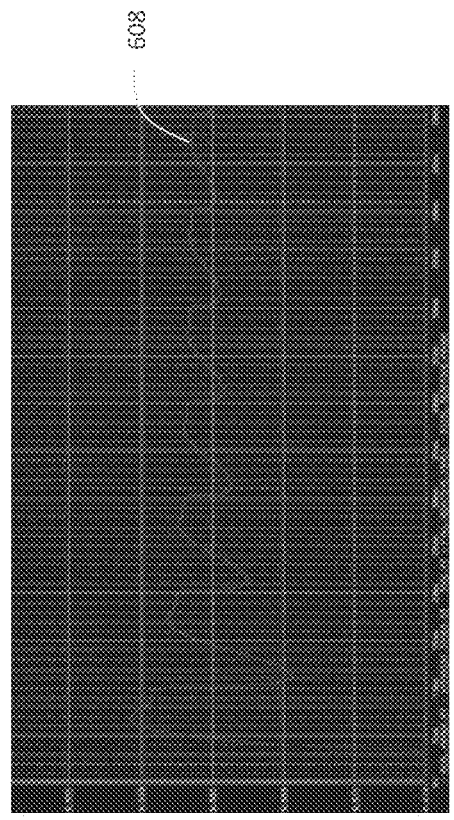
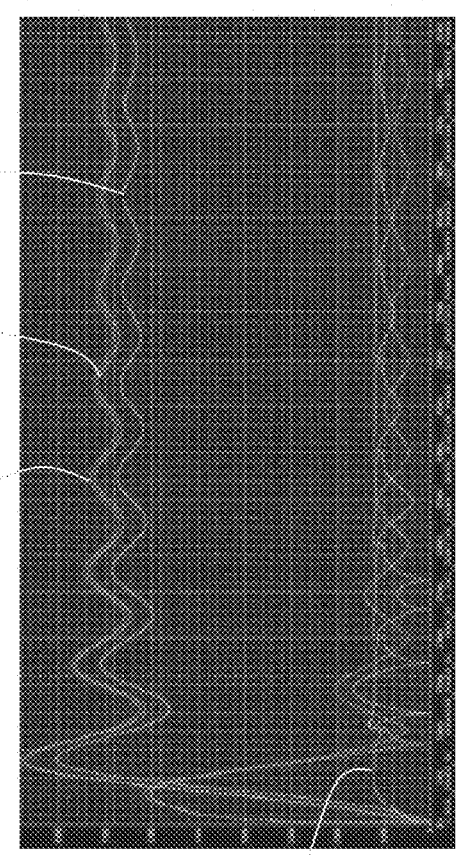
Figure 6e
Figure 6f

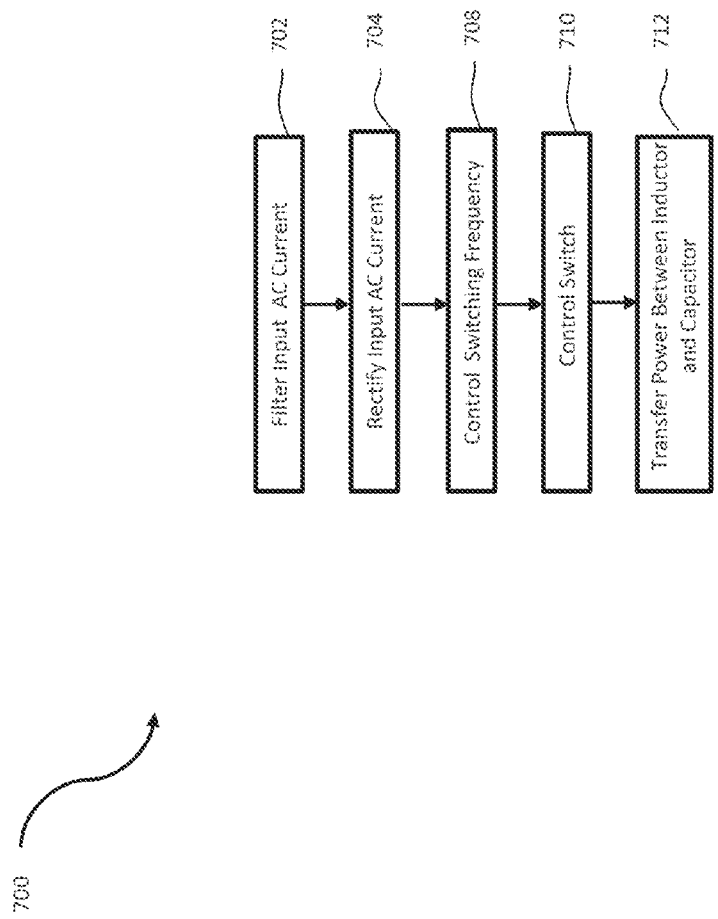

ACTIVE POWER FACTOR CORRECTOR CIRCUIT

TECHNICAL FIELD

The present invention relates to the field of circuits, in particular to active power factor corrector circuits.

BACKGROUND

In electronic devices, power factor corrector (PFC) circuits are increasingly used to increase the power factor (PF) of AC electric power systems. In electronic power systems, a load with a low power factor draws more current than a load with a high power factor for the same amount of useful power transferred. When the power factor is low, the high current causes energy to be lost in the distribution system, requiring larger wires and other equipment capable of handling the higher current compared to a system with a higher power factor.

Because of the costs of larger equipment and wasted energy, electrical utilities will charge a higher cost to industrial or commercial customers who have a low power factor than to those who have a higher power factor. Power factor regulations are also becoming increasingly prevalent.

Power factor correction may be especially relevant for high power applications. At a high power, small differences in power factor can lead to significant cost savings. High power electronic power systems are becoming increasingly important in AC electric power systems.

A power factor corrector may be implemented using a switched-mode power supply. Power factor corrector circuits are generally optimized to have a high power factor for a particular switching frequency and load. However, applications often involve a load current that varies. Accordingly, there is a need for an active PFC circuit that can maintain a high power factor over a range of load currents.

SUMMARY OF THE INVENTION

In accordance with an embodiment, an electronic device includes a controller configured to be coupled to a first switch of a power factor corrector. The controller is configured to produce a variable switching frequency depending on a load current. For a first load current, the controller is configured to produce a first switching frequency, and for a second load current, the controller is configured to produce a second switching frequency.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6*a-f* illustrate results of simulations of embodiments of an active PFC circuit; and FIG. 7 illustrates the flowchart for an embodiment method for outputting a DC voltage.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an active PFC circuit. The invention may also be applied, however, to other types of circuits, systems, and methods.

The power factor, a dimensionless number between zero and one, is defined as the ratio of the real power flowing to the load to the apparent power in the circuit. Real power is the capacity of the circuit to perform work at a particular time, while apparent power is the product of the current and the voltage of the circuit. Due to energy stored in the load and returned to the source and due to a non-linear load that distorts the wave shape of the current drawn from the source, the apparent power tends to be greater than the real power.

A power factor correction (PFC) circuit may be active or passive. A passive PFC circuit includes inductors and/or capacitors. An active PFC circuit, on the other hand, is a power electronic system that changes the wave-shape of the current drawn by a load to improve the power factor. In a power factor corrected circuit, the voltage and current are more in phase and the amount of reactive power is reduced.

Active PFC circuits may be implemented using boost converters, buck converters, buck-boost converters, or other topologies. Active PFC circuits can operate in various modes, including continuous conduction mode (CCM), discontinuous conduction mode (DCM), critical conduction mode (CRM), and other modes of operation.

One application for an active PFC circuit is the charging of batteries, in particular electric vehicle batteries. Overcharging can damage batteries. Charging a battery begins in a current controlled mode and progresses through a power controlled mode to a voltage controlled mode. During this progression, the load on the circuit and the current may vary.

Figure 1A:
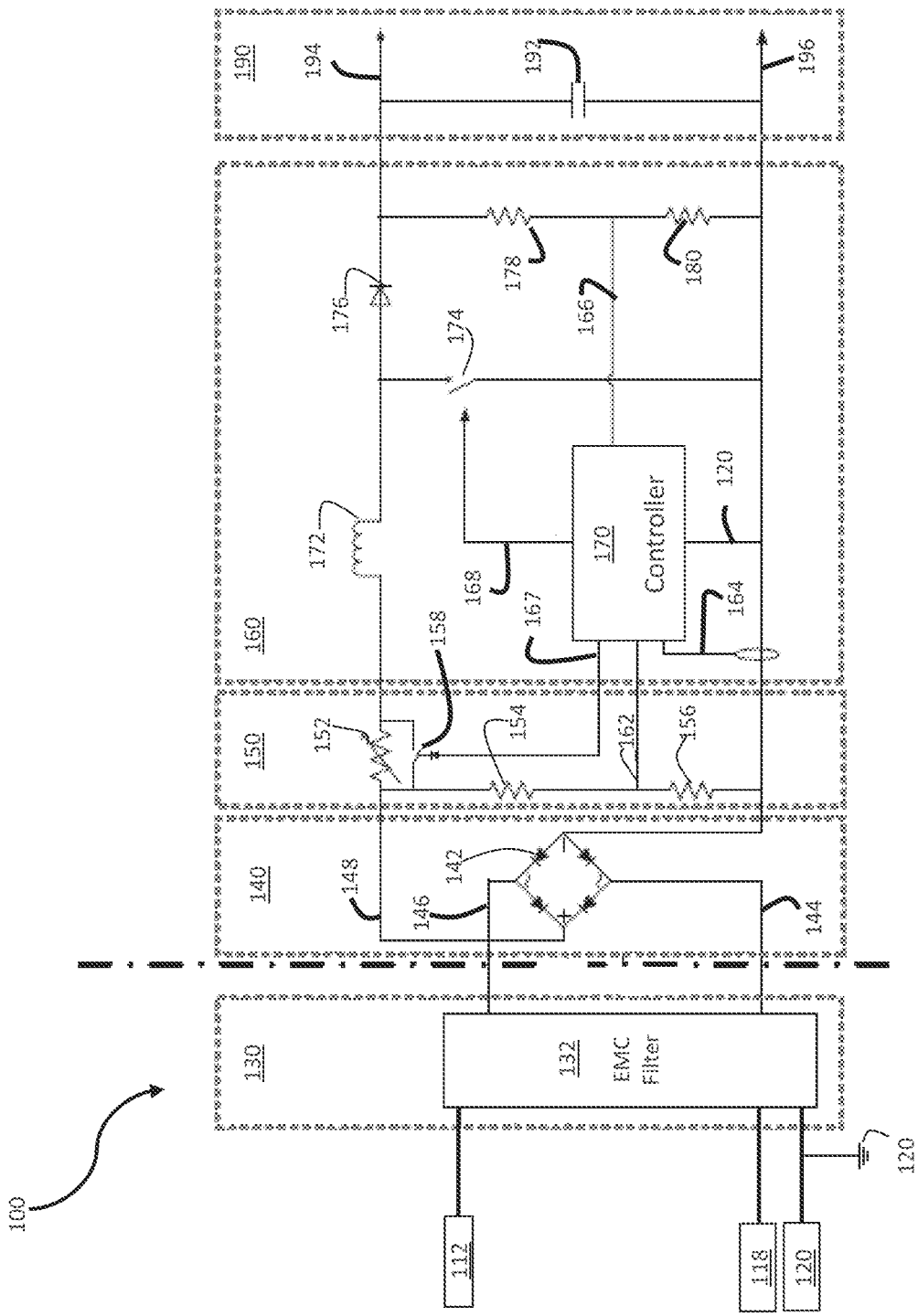
FIGS. 1*a-b* illustrate an embodiment of an active PFC.
Figure 1B:
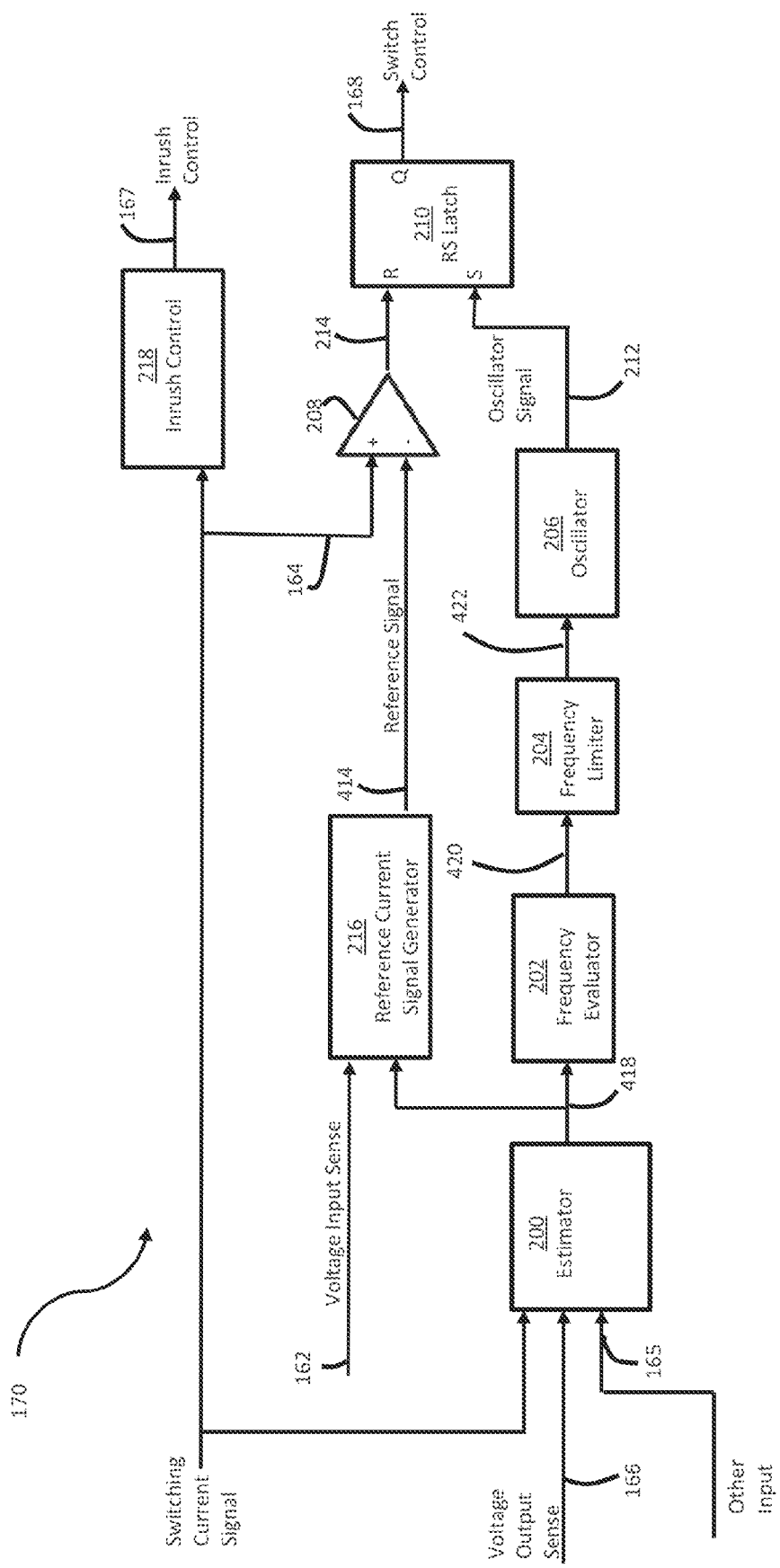

FIGS. 1*a* and 1*b* illustrate an embodiment of active power factor corrector (PFC) circuit 100, in which a switching frequency of the active PFC varies according to an output load current. Active PFC 100 may be a single stage PFC including only one converter stage having an output characteristic that is suitable to charge a battery. In an embodiment, active PFC circuit 100 operates in a continuous conduction mode (CCM); however active PFC circuit 100 may operate in other conduction modes. FIG. 1*a* illustrates a high level view of the active PFC circuit. Active PFC circuit 100 includes AC input 112, 118, and 120, filtering block 130, rectification phase 140, in-rush current limitation phase 150, power factor corrector phase 160, and DC output phase 190. DC output phase 190 may be coupled to a battery to charge the battery (battery not pictured).

The AC input includes input terminal 112, neutral phase input 118, and earth ground 120 that are coupled to EMC filter 132. In filtering block 130, EMC filter 132 outputs signal 144 and signal 146 to reduce a switching noise component from the input current. Rectifier 142 in rectification phase 140 rectifies output signal 144 and EMC output 146, to produce rectified signal 148. The rectified current is a rectified sinusoidal signal with a frequency that is twice the frequency of the grid voltage. In alternative embodiments, a two phase AC input or three phase AC input may be used instead of the single phase AC input shown. The AC input phase may be obtained from a sinusoidal power grid.

Inrush current limitation phase 150 may include resistors 152, 154, 156, and switch 158. During startup, inrush control 167 causes switch 158 to open, thereby causing current to flow through resistor 152, in order to avoid large current transient. After the system settles, inrush control 167 causes switch 158 to close and bypasses resistor 152. Switch 158 may remain closed during normal operation. Resistor 154 and resistor 156 form a voltage divider and provide a signal proportional to rectified signal 148 to controller 170. Inrush current may be limited using other methods known in the art.

Power factor corrector phase 160 is configured to generate an output voltage and an output current dependent on an input current such that there is a predefined phase difference between the input voltage and the input current, such as zero. However, there are also operation scenarios possible in which a phase difference other than zero is desired. Controller 170 provides inrush control signal 167 and switch control signal 168 based on voltage output sense 166, voltage input sense 162, and switching current signal 164. Resistors 178 and 180 form a voltage divider so that output sense voltage 166 may be measured. Switch control 168 turns switch 174 on and off. Switch 174 may be implemented using a MOSFET, IGBT, or other switching device. When switch 174 is turned on, current flows through inductor 172 and energy is stored in inductor 172. When switch 174 is turned off, the energy stored in inductor 172 flows across diode 176, capacitor 192, and across DC voltage 196 through a load (not pictured). The load may be a rechargeable battery, such as a Lithium Ion battery. Voltage 194 represents the charging voltage of the battery. Diode 176 prevents load capacitance from discharging through switch 174. When switch 174 is off, energy flows from inductor 172 to capacitor 192. By controlling switch 174, various system parameters, such as the output voltage, output current, and input current may be controlled.

FIG. 1b illustrates an embodiment of controller 170. Controller 170 in FIG. 1b may be used as controller 170 in active PFC circuit 100; however, controller 170 may be a part of another type of PFC system. Controller 170 may be implemented in analog or digital circuitry. The inputs to controller 170 are voltage input sense 162, switching current signal 164, voltage output sense 166, and other input 165. Other input 165 may include any other system variable that has an effect on the load current of active PFC 100, such as load status, system status, or other system measurements. The outputs of controller 170 are inrush control signal 167 and switch control 168. Inrush control calculator 218 determines inrush control signal 167 based on internal power states using techniques known in the art.

Estimator 200 determines correction factor 418 based on switching current signal 164, voltage output sense 166, and/or other inputs represented as input 165. Next, frequency evaluator 202 outputs frequency 420 based on correction factor 418. Frequency evaluator 202 may determine output frequency 420 using a look-up table interpolated from output sense 418 or by calculating output frequency 420 using formulas using signal output sense 418 as an input. Frequency limiter 204 limits frequency 420 to a frequency that is within an acceptable range of from about 20 kHz to about 500 kHz, and outputs corrected frequency 422. Alternatively, other ranges may be used depending on the system and its particular specifications. Corrected frequency 422 then causes oscillator 206 to output oscillator signal 212.

Reference current signal generator 216 generates reference current signal 414 based on voltage input sense 162 and correction factor 418. Reference current signal 414 may be in phase with voltage input sense 162. Reference current signal 414 represents an ideal current signal that is perfectly in phase with the voltage 162 at the input of the system. In some embodiments, reference current signal 414 may be proportional to input voltage 162. In other embodiments, slope compensation may be added according to techniques known in the art. Reference current signal 414 and switching current signal 164 are the inputs to comparator 208, which outputs comparator output 214. RS latch 210 latches comparator output 214 as the reset and oscillator signal 212 as the set, with switch control 168 as the Q output, the non-inverting output in the present embodiment.

During operation, switching current signal 164 starts to increase each time latch 210 is set via oscillator signal 212, which occurs when switch control 168 assumes an on-level and switches switch 174 in FIG. 1a on. Latch 210 is reset when the switching current signal 164 reaches reference signal 414. Reference signal 414 depends on voltage input sense 162 and correction factor 418. Some embodiments may incorporate concepts, systems and methods described in U.S. patent application Ser. No. 13/472,215 filed on May 15, 2012 entitled "Power Converter Circuit," which application is incorporated by reference herein in its entirety.

Figure 2A:
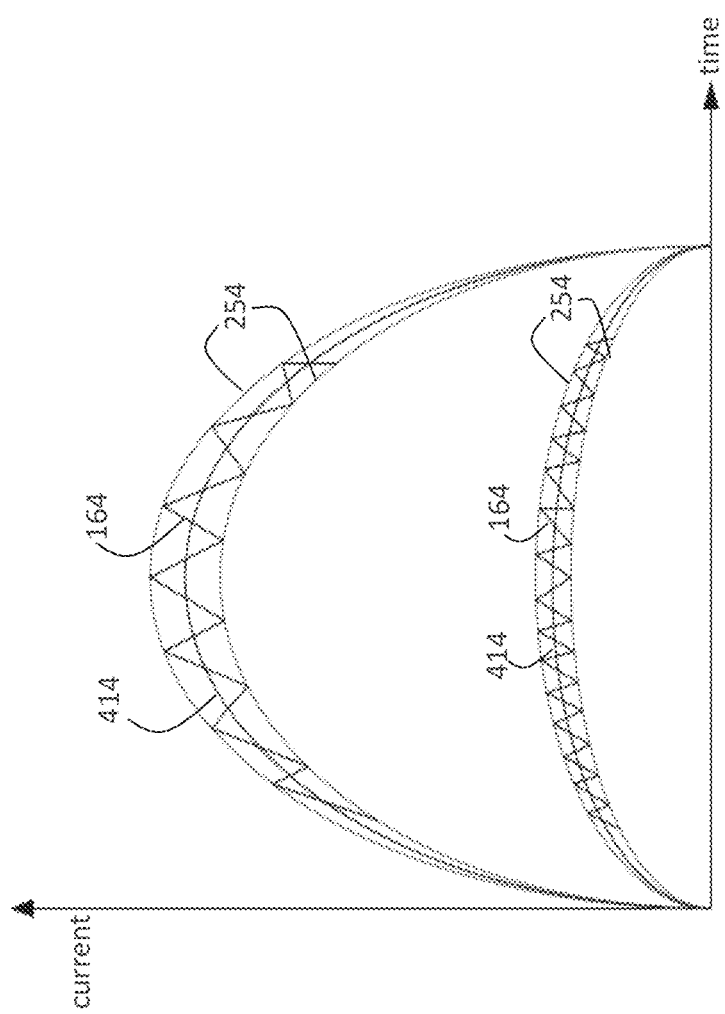
FIGS. 2*a-d* illustrate a waveform diagram of the switching current and input current for embodiments of an active PFC circuit.

FIGS. 2a-d illustrate a waveform diagram showing the switching current and input current for embodiments of an active PFC circuit. FIG. 2a illustrates reference current signal 414, switching current signal 164, and envelope 254 for two different switching frequencies. In FIG. 2a, reference current signal 414 represents an ideal "average" current that is phase matched to the voltage and reference current signal 414 is the current that the active PFC circuit is trying to match. Switching current signal 164 represents the actual current generated by the active PFC. Switching current signal 164 varies above and below reference current signal 414 with envelope 254. When switching current signal 164 closely follows reference current signal 414, as in FIG. 2a, the power factor is high. The upper curves illustrate a higher current and a lower switching frequency than the lower curves. In some embodiments, frequency increases with lower load currents. This might be done to keep a constant percent ripple.

Figure 2B:
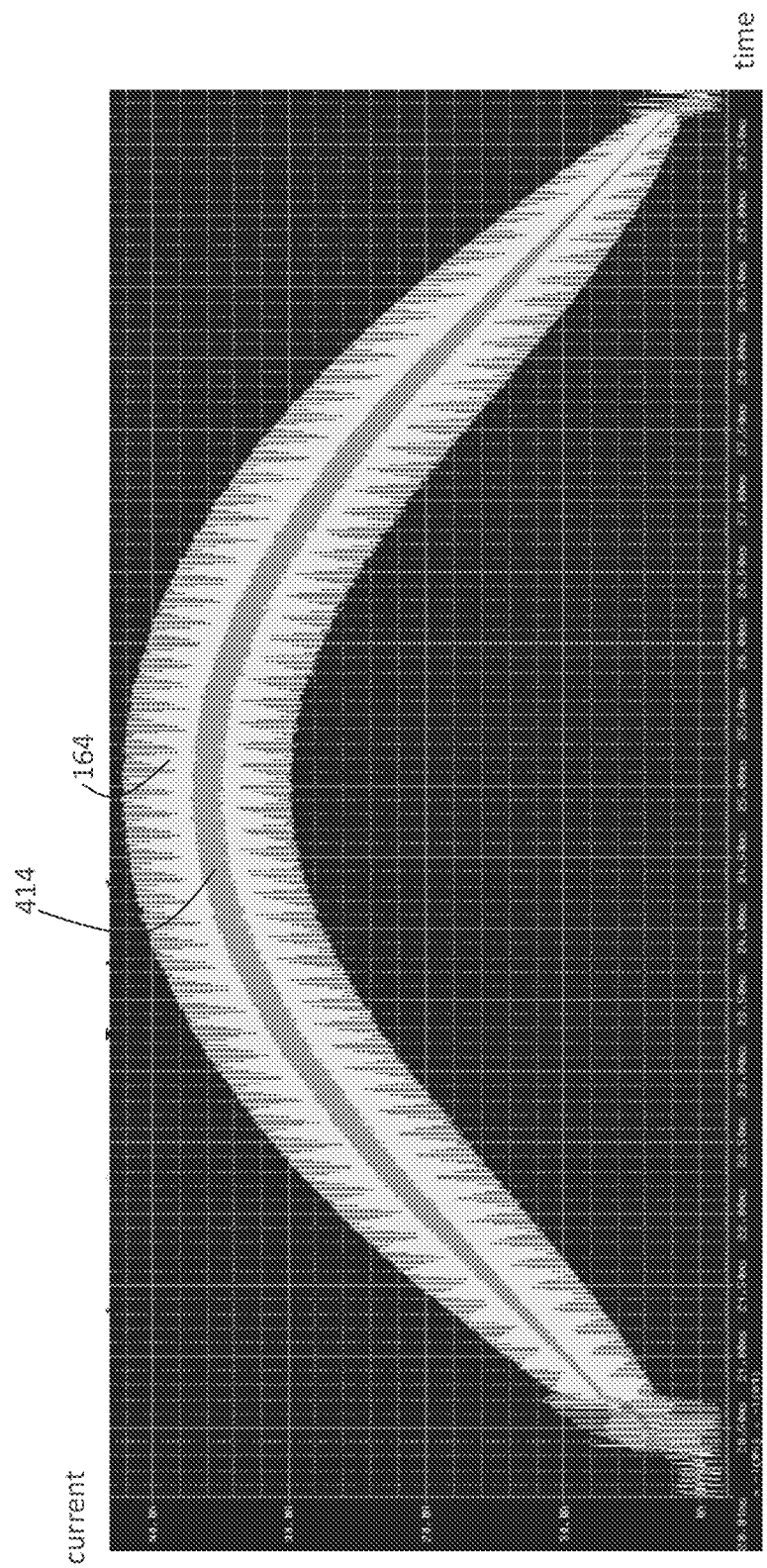

FIG. 2b illustrates switching current signal 164 switching current 414 for a CCM active PFC circuit having a peak current of 40 A and a switching frequency of 100 kHz. Switching current signal 164 varies above and below a sinusoidal reference current signal and has an envelope that follows the shape of the reference current signal. Current signal 414 is the switching current measured on the input pins of the active PFC.

Figure 2C:
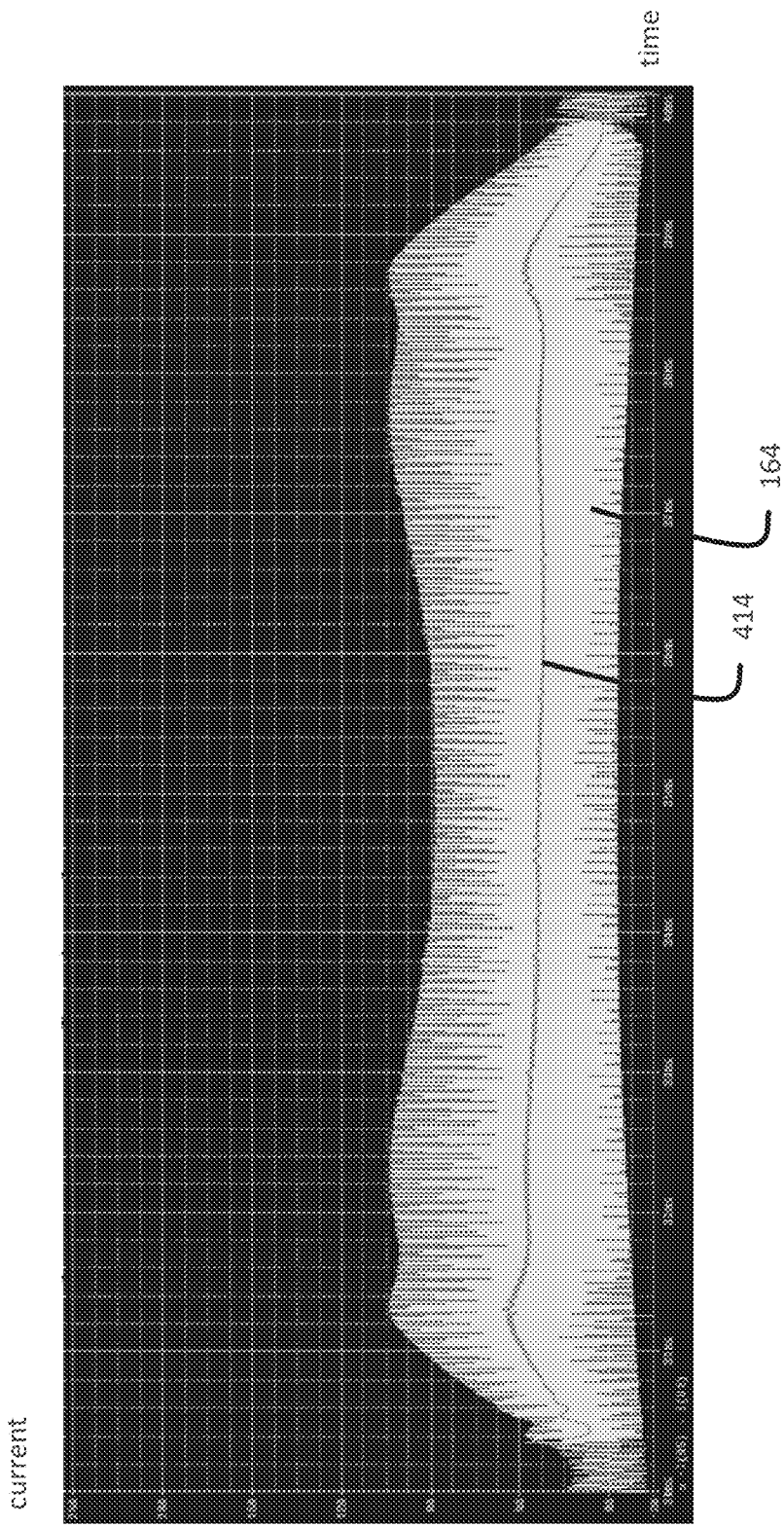

FIG. 2c illustrates switching current signal 164 and switching current 414 for a CCM active PFC having a peak current of 4 A, also having a switching frequency of 100 kHz. Holding the switching frequency constant while reducing the peak current distorts switching current signal 164 such that its envelope does not closely follow the shape of the reference current signal that is sinusoidal. The distortion in the wave shape causes a decrease in the power factor. It can be further seen that switching current 164 may take on negative values. The current signal 414 is the switching current measured on the input pins of the active PFC.

Figure 2D:
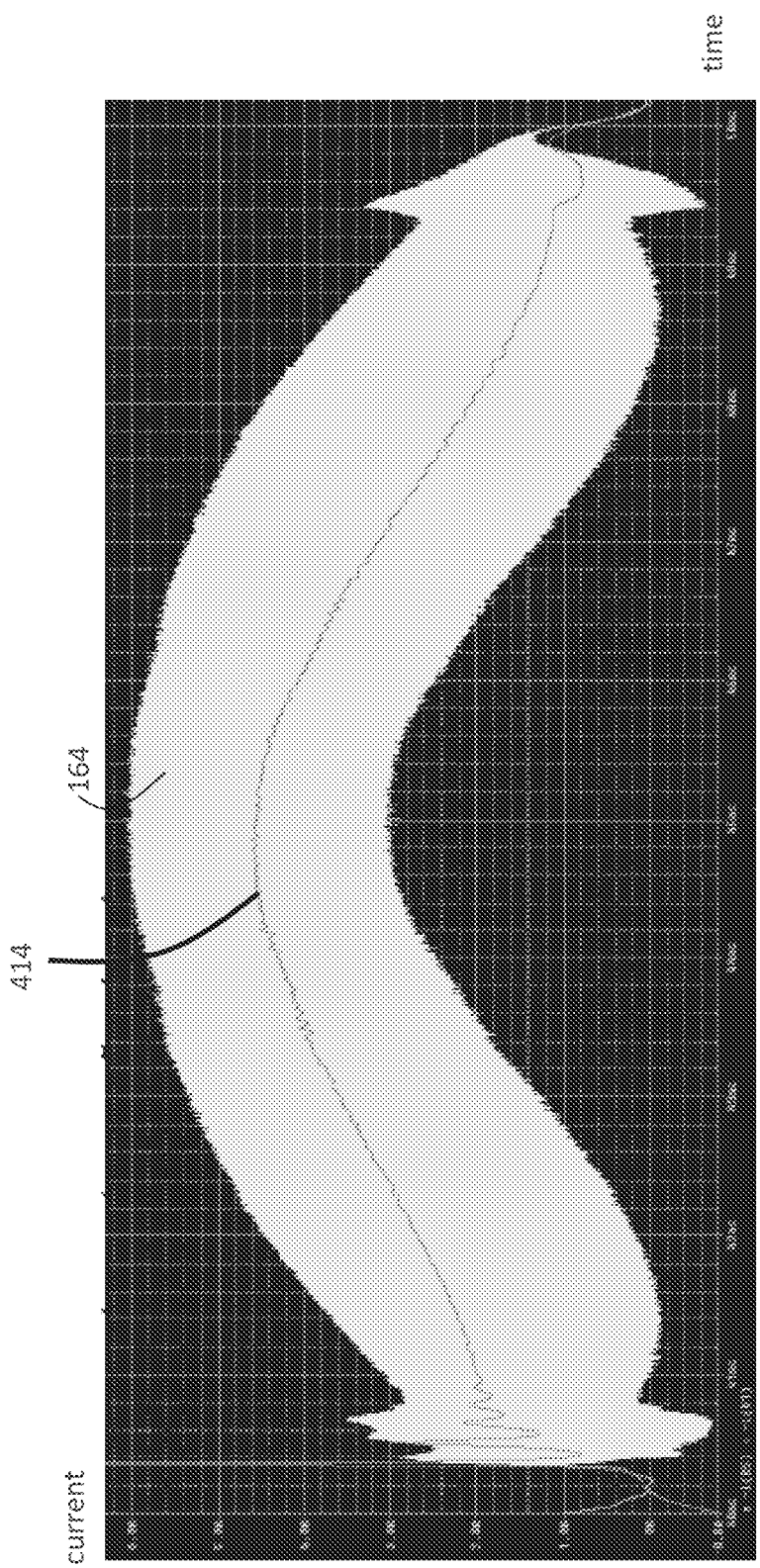

FIG. 2d illustrates switching current signal 164 switching current 414 for a CCM active PFC having a peak current of 4 A but an increased switching frequency of 310 kHz. As shown, the envelope of switching current signal 164 follows the shape of the sinusoidal reference current signal more closely than the system operating at 100 kHz.

Figure 3:
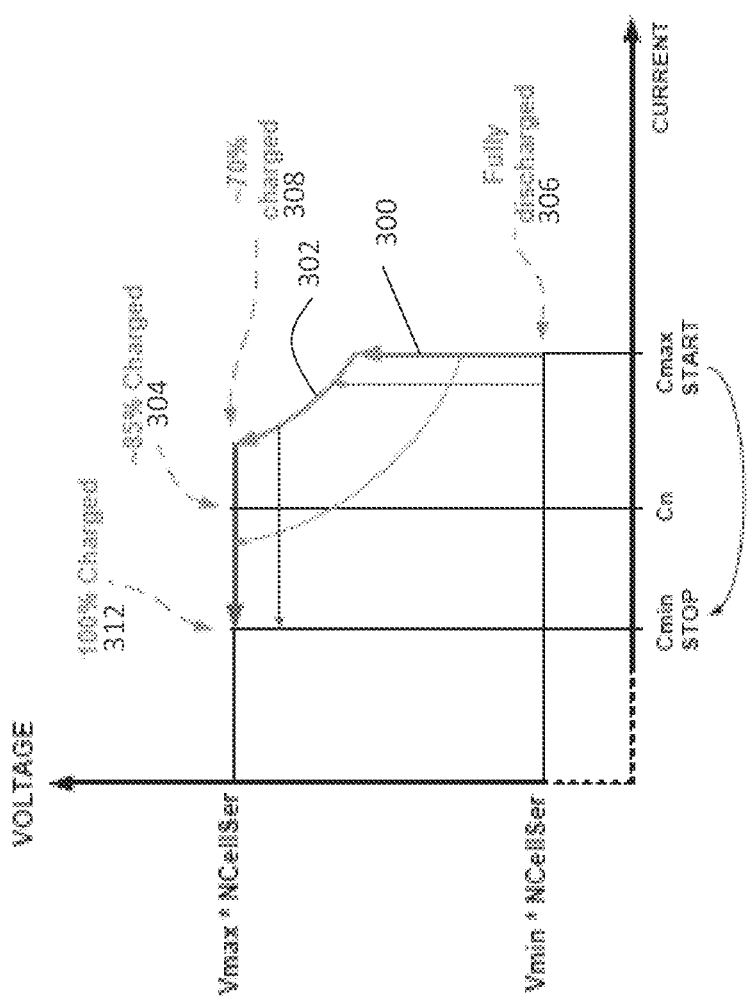
FIG. 3 illustrates a voltage v. current graph for charging of a battery.

FIG. 3 illustrates the voltage and current for charging a battery. The rechargeable battery may include a plurality of battery cells connected in series or in another configuration. The rechargeable battery may be a Lithium-Ion battery, or any other type of rechargeable battery. When a battery is fully discharged, at point 306, the battery voltage is at a minimum. Beginning at a fully discharged state, charging a battery begins in current controlled regime 300. In current controlled regime 300, current is constant at the maximum current while voltage increases. Once a particular voltage is reached the battery charger enters the power controlled regime 302. In power controlled regime 302, voltage increases while current decreases, holding power constant. When the voltage reaches a maximum voltage at charge point 308, the battery charger enters voltage controlled regime 304. In voltage controlled regime 304, voltage remains constant while current decreases, until the battery reaches fully charged point 312, and charging stops. During the course of charging a battery, the battery charger reduces its charging current as the battery becomes more fully charged.

Figure 4:
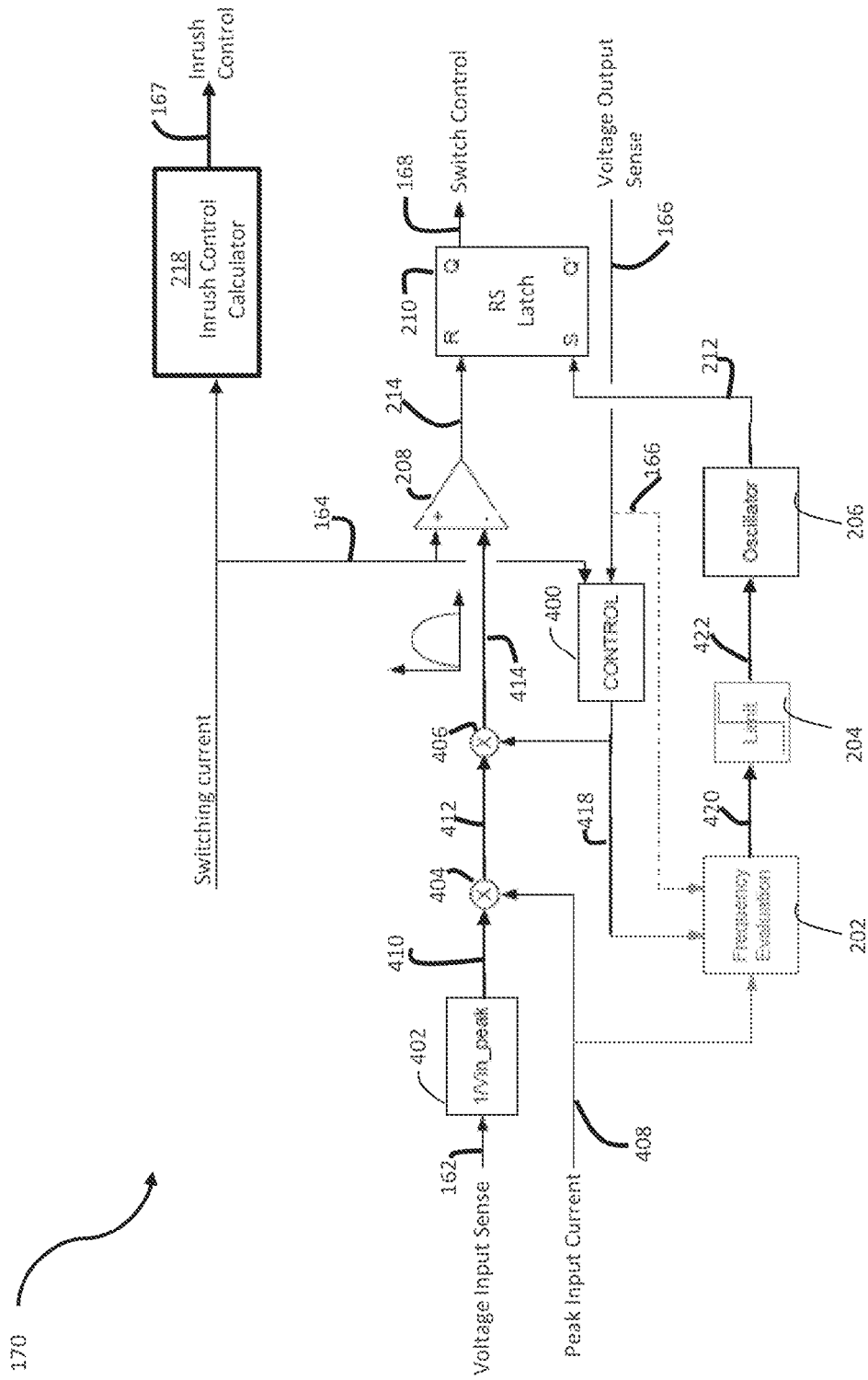
FIG. 4 illustrates an embodiment controller of an active PFC circuit.

FIG. 4 illustrates embodiment controller 170 for an active PFC circuit that may be used to charge a battery. Controller 400 determines correction factor 418 based on voltage output sense 166 and optionally switching current signal 164. In some embodiments, correction factor 418 is based on a battery charging curve. For example, in some embodiments, controller 400 will generate correction factor 418 such that the output load current is constant when the output voltage is below a first threshold. When the output voltage is above the first threshold but below a second threshold, the current is controlled such that the current decreases when the voltage increases, holding the output power is constant. In the constant power mode, the current may decrease in a stepwise manner instead of continuously, as pictured. When the output voltage is above a second threshold, the output voltage is controlled to be substantially constant. The output current decreases, and operation ceases once the output current drops below a predetermined threshold. Controller 400 may be implemented using analog or digital circuitry. Controller 400 may determine correction factor 418 using a digital processor or an analog circuit having a requisite piecewise linear transfer function. Next, frequency evaluator 202 outputs frequency 420 based on correction factor 418, peak input current 408, and optionally voltage output sense 166. The peak input current 408 represents the maximum current available in the input AC phase line. Peak input current 408 could be a constant value, a calibration value, or a variable value. Peak input current may be updated manually or automatically using a proper communication line. In some embodiments, frequency evaluator 202 determines the frequency 420 using a look-up table. In other embodiments frequency evaluator 202 calculates the frequency 420 using formulas. Frequency limiter 204 limits frequency 420 to a frequency that is within a usable range for the system. For example, in one embodiment, input 422 of oscillator 206 is limited such that the output frequency of oscillator 206 is limited to a range from about 20 kHz to about 500 kHz.

Voltage normalizer 402 produces reference signal 410 based on the input voltage of the PFC. In an embodiment, voltage input sense 162 is normalized by the peak input voltage to output reference signal 410. Reference signal 410 is multiplied by peak input current 408 by multiplier 404 to yield reference current 412. Reference current 412 is multiplied by correction factor 418 by multiplier 406 to yield corrected reference current signal 414.

Corrected reference current signal 414 and switching current signal 164 are input to comparator 208, which provides comparator output 214. Comparator output 214 is coupled to the reset input and oscillator signal 212 is coupled to the set input of RS latch 210. Output Q of RS latch 210 is coupled to switch control 168. Inrush control calculator 218 determines inrush control 167 based on switching current signal 164 as with respect to FIG. 1b described above.

Figure 5A:
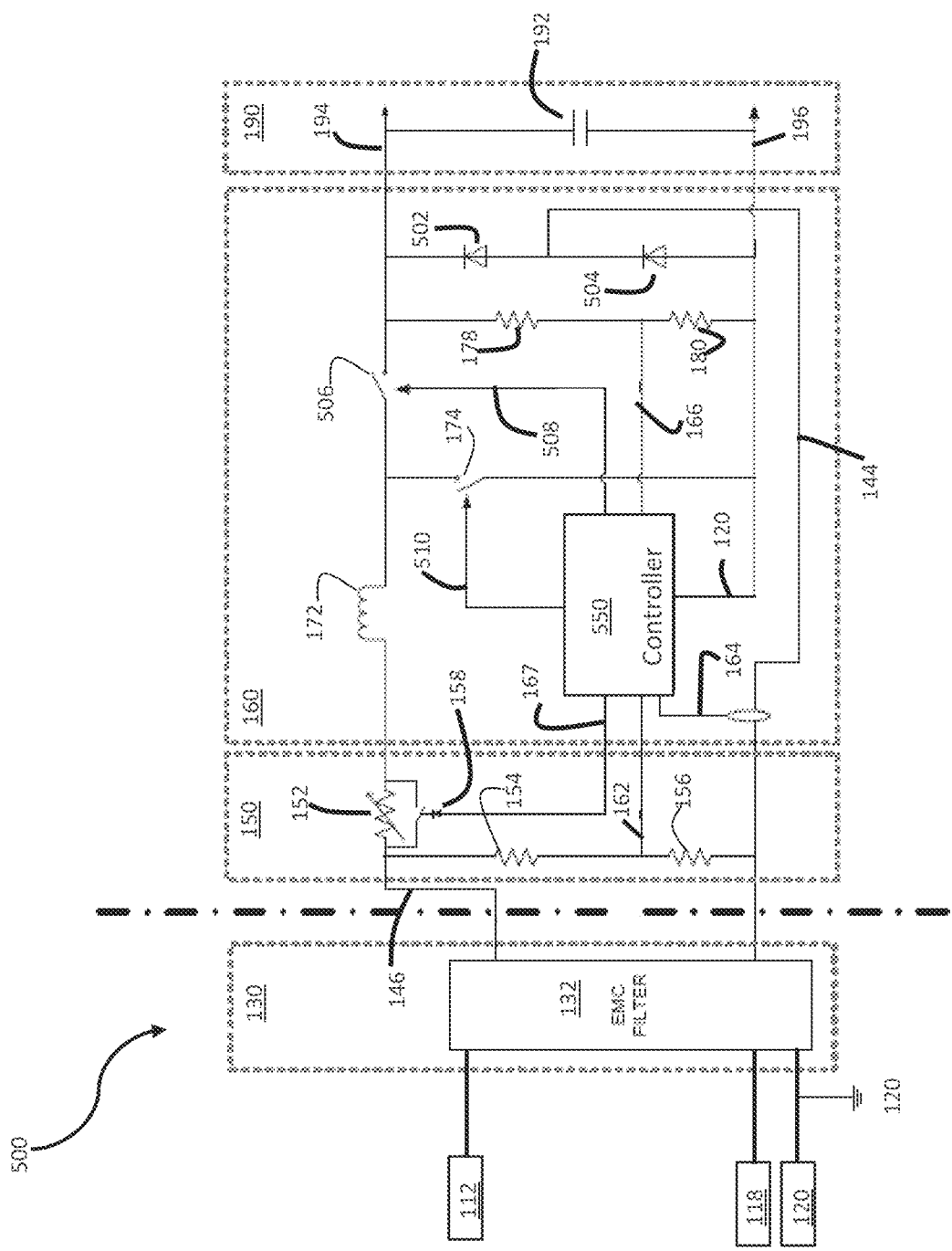
FIGS. 5*a-b* illustrate an active PFC according to a further embodiment.
Figure 5B:
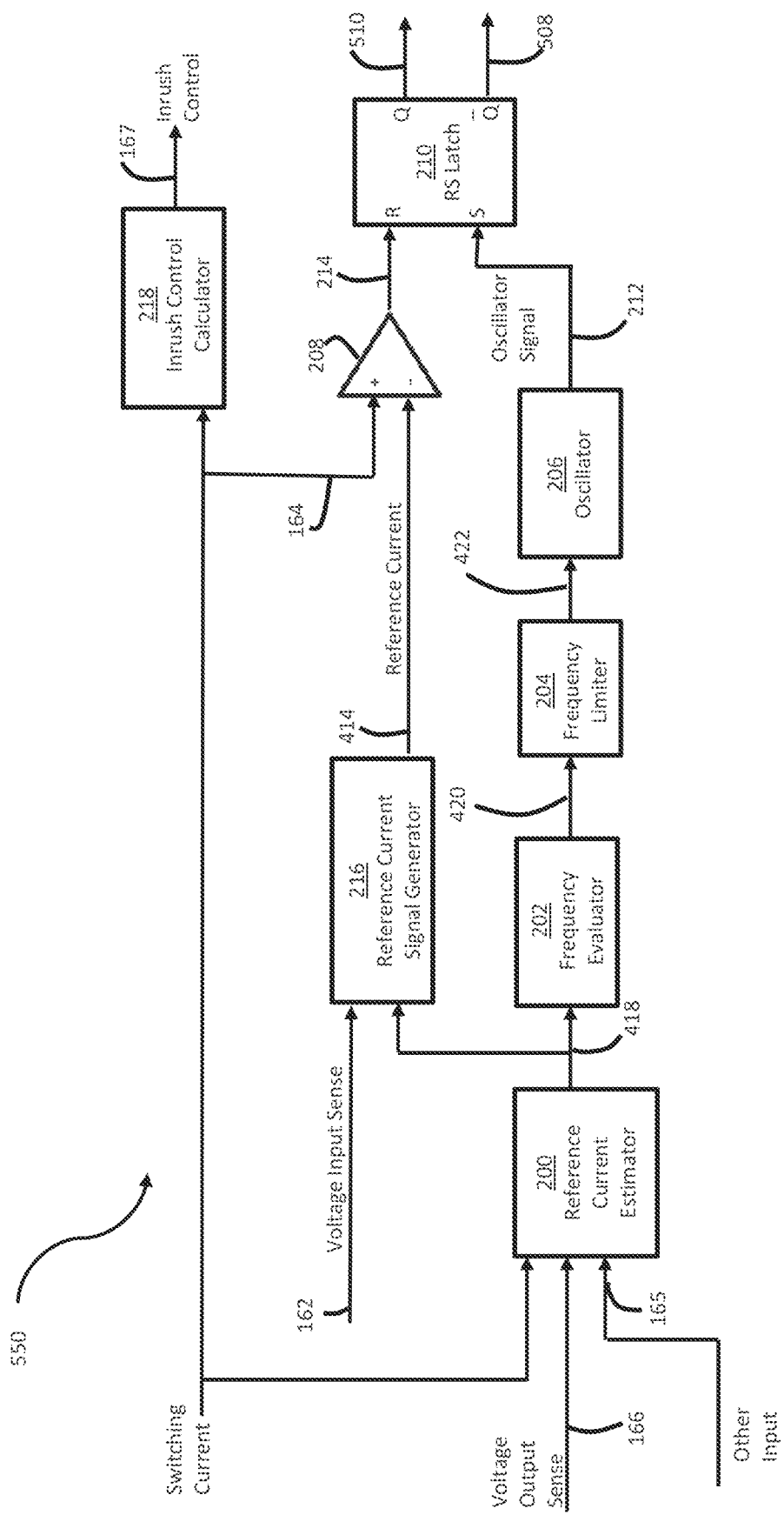

FIGS. 5a and 5b illustrate an embodiment of active power factor converter (PFC) circuit 500 capable of varying the switching frequency. The circuits in FIGS. 5a-b are similar to circuits 100 and 170 in FIGS. 1a-b, except that rectification phase 140 is omitted and output rectifier diode 176 is replaced by switch 506 to provide synchronous rectification. FIG. 5a illustrates a high level view of the active PFC circuit. EMC output 146 is directly connected to inrush current limitation phase 150.

Controller 550 outputs inrush control 167, switch control 508, and switch control 510 based on voltage output sense 166, voltage input sense 162, switching current signal 164, and ground 196. One of the body diodes of switch 506 acts as a diode in circuit 500. In an embodiment, switch control signals 508 and 510 are non-overlapping signals. Switch control signal 510 may correspond to switch control 168 as explained above. Switch control 510 is coupled to switch 174, while switch control signal 508 is coupled to switch 506. When switch 174 is turned on and switch 506 is turned off, current flows through inductor 172 and energy is stored in inductor 172. When switch 174 is turned off and switch 506 is turned on, the energy stored in inductor 172 flows to capacitor 192, and across DC voltage 194 through a load (not shown). When switch 174 is off, energy flows from inductor 172 to capacitor 192.

FIG. 5b illustrates an embodiment of controller 550 that outputs inrush control signal 167, switch control 508, and switch control 510. RS latch 210 generates switch control signals 510 and 508. In some embodiments, a non-overlapping clock generator may be coupled to the output of RS latch 210.

Figure 6C:
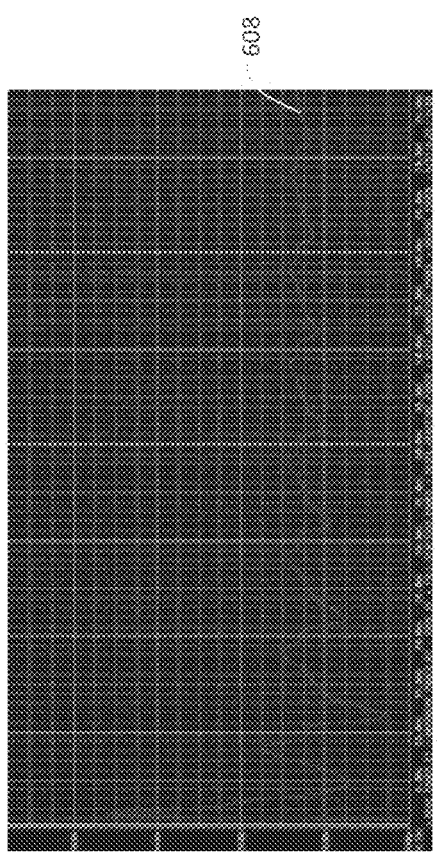

FIGS. 6a-f illustrate simulation results of an embodiment active PFC circuit. FIGS. 6a and 6b illustrate simulation results for an embodiment operating at 5000 W at a frequency of 100 kHz, with a peak power of 40 A. Active power 603 and apparent power 602 are each 5000 W. Reactive power 606 is 220 W. This configuration has a power factor 608 of 99.8%. Output power 604 is 4840 W, and the efficiency is 96.8%.

Figure 6D:
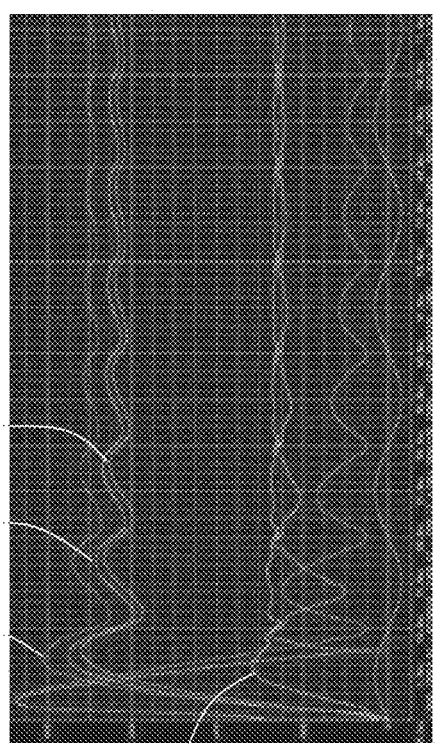

FIGS. 6c and 6d illustrate simulation results for an embodiment operating at 650 W, at a frequency of 100 kHz, with a peak current of 4 A. Active power 603 is 650 W, while apparent power 602 is 700 W. Reactive power 606 is 230 W. The power factor 608 of this configuration is 92.5%. Output power 604 is 631 W, and the efficiency is 97.1%.

FIGS. 6e and 6f illustrate simulation results for an embodiment operating at a power of 690 W, at a frequency of 310 kHz with a peak current of 4 A. In this example, active power 603 is about 690 W, while apparent power 602 is about 700 W. Reactive power 606 is about 120 W, the power factor is about 98.5%, the output power 604 is about 641 W, and the efficiency is 92.9%. It should be appreciated that the simulation results depicted in FIGS. 6a-f represent the performance of one example embodiment. In alternative embodiments, different performance may be achieved.

FIG. 7 illustrates a flowchart of method 700 for an embodiment active PFC circuit. Method 700 of outputting a DC voltage includes filtering an input AC current (step 702), rectifying the input AC current (step 704), controlling a switching frequency (step 708), controlling a switch (step 710), and transferring power between an inductor and a capacitor (step 712).

In accordance with an embodiment, an electronic device may include a controller configured to be coupled to a first switch of a power factor corrector. The controller is configured to produce a first switching frequency for a first load current and a second switching frequency for a second load current, such that when the first load current is higher than the second load current, the first switching frequency is lower than the second switching frequency. When the first load current is higher than the second load current, the first switching frequency is lower than the second switching frequency. Alternately, when a first load voltage is lower than a second load voltage, the first switching frequency is lower than the second switching frequency. The controller may include an estimator configured to determine a correction factor from an output signal of the device.

In an embodiment, the device may include a frequency evaluator coupled to the estimator. The frequency evaluator may be configured to determine a frequency based on the correction factor and a peak input current, and may be configured to determine the frequency based on an output voltage. The output signal may be a current, a voltage, or a power. In an embodiment, the frequency evaluator may be implemented using a look-up table. Alternately, the frequency evaluator may calculate the correction factor based on a formula. The frequency evaluator may be further configured to calculate the correction factor based on a battery charging characteristic.

The controller may include an oscillator having a frequency control input coupled to the frequency evaluator. Furthermore, the controller may include a limiter coupled between the frequency evaluator and the frequency control input of the oscillator. In some embodiments, the controller may include a latch having a first input coupled to the oscillator and an output configured to be coupled to a control node of the first switch, and a comparator coupled to a second input of the latch. The controller may also include a reference current signal generator coupled to the comparator. The reference current signal generator may be configured to determine the reference current signal based on a voltage input. The latch may determine a second switch control signal from a comparator output signal and an output of the oscillator.

In an embodiment, the electronic device may include a first switch coupled to the controller. The electronic device may include an inductor coupled to the first switch and a second switch coupled to the inductor. Further, the electric device may include a capacitor coupled to the first switch and a first diode coupled to the second switch. The electronic device may also include a second diode coupled to the first diode and a first voltage divider coupled to the first diode and the controller.

Alternately, the electronic device may include a first switch coupled to the controller. The electronic device may also include an inductor coupled to the first switch and a diode coupled to the first switch. Also, the electronic device may include a capacitor coupled to the first switch and a first voltage divider coupled to the controller. The electronic device may also include a second voltage divider coupled to the controller, an inrush current limiter coupled to the controller, and an inrush control calculator coupled to the inrush current limiter.

In a further embodiment, the electronic device may include an AC input node and a rectifier coupled between the AC input node and the controller.

In an embodiment, a method of controlling a power factor corrector may include determining a switching frequency of the power factor corrector, which includes determining a load current and assigning a switching frequency for the load current. The first switching frequency is lower than a second switching frequency when a first load current may be higher than a second load current. Alternately, the first switching frequency is lower than a second switching frequency when the first load voltage is lower than a second load voltage.

Also, the method may include controlling a switch coupled to an inductor of the power factor corrector at the determined switching frequency. The method may further include transferring power between an inductor and a capacitor when the switch is open. Determining the load current may include measuring the load current, while determining the load current may include determining the load current based on an output voltage of the power factor corrector.

In a further embodiment, a circuit includes a power factor corrector circuit which includes a controller configured to produce a first switching frequency for a first load current and a second switching frequency for a second load current. The circuit also includes an AC input coupled to the power factor corrector circuit and a DC output coupled to the power factor corrector circuit. The first load current is higher than the second load current when the first switching frequency is lower than the second switching frequency. Also, the circuit may include a rectifier coupled between the AC input and the power factor corrector circuit.

The power factor corrector circuit may also include a switch coupled to the controller, an inductor coupled to the switch, a capacitor coupled to the switch, and a voltage divider coupled between the inductor and the ground node. The output voltage of the voltage divider may be coupled to an input of the controller.

The controller may include an estimator configured to determine a correction factor based on a signal of the DC output. Also, the controller may include a frequency evaluator coupled to the estimator. The frequency evaluator may be configured to determine the first switching frequency and the second switching frequency based on the correction factor and a peak input current. The signal may comprise a current, a voltage, or a power. The frequency evaluator may be configured to determine the first switching frequency and the second frequency based on an output voltage. The controller may include an oscillator coupled to the frequency evaluator. The oscillator may be configured to provide an oscillator signal based on the frequency. The controller may include a latch having a first input coupled to the oscillator, an output configured to be coupled to a control node of the first switch, and a comparator coupled to a second input of the latch. Also, the controller may include a reference current signal generator coupled to the comparator. The reference current signal generator may be configured to determine the reference current based on a voltage input.

In an embodiment, a device for charging a battery includes a power factor converter. The power factor converter includes a controller configured to produce a first switching frequency for a first load current and a second switching frequency for a second load current. The switching frequency may be determined based on a battery charging curve. The first load current is higher than the second load current when the first switching frequency is lower than the second switching frequency. In an embodiment, the power factor converter may include a switch coupled to the controller, an inductor coupled to the switch, and a capacitor coupled to the switch. The power factor converter may include an AC input and a DC output coupled to a battery. The controller may be configured to control a DC output current or power or voltage based on a battery voltage. Further, the controller may be configured to control the DC output such that the DC output has a constant current and increasing voltage if the battery is charged up to a first percentage. The DC output has a decreasing current and an increasing voltage with a constant power if the battery is charged between the first percentage and a second percentage. Alternately the DC output has a decreasing current and constant voltage if the battery is charged more than the second percentage.

Advantages of embodiments include an ability to alter the switching frequency of an active PFC to adjust for a varying load current, so that a higher switching frequency can be used for a lower load current, leading to a high power factor for a variety of load currents.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. An electronic device comprising:
   a controller configured to be coupled to a first switch of a power factor corrector, the controller configured to produce a variable switching frequency depending on a load current, the controller configured to produce a first switching frequency for a first load current and a second switching frequency for a second load current, wherein the controller further comprises
      an estimator configured to determine a correction factor in accordance with an output signal of the device, and
      a frequency evaluator coupled to the estimator, wherein the frequency evaluator is configured to determine a frequency in accordance with the correction factor and a peak input current.

2. The electronic device of claim 1, wherein the controller is further configured to produce the switching frequency depending on a load voltage.

3. The electronic device of claim 2, wherein a first load voltage is lower than a second load voltage, and the first switching frequency is lower than the second switching frequency.

4. The electronic device of claim 1, wherein the first load current is higher than the second load current, and the first switching frequency is lower than the second switching frequency.

5. The electronic device of claim 4, wherein the device further comprises:
   a first switch coupled to the controller;
   an inductor coupled to the first switch;
   a second switch coupled to the inductor;
   a capacitor coupled to the first switch;
   a first diode coupled to the second switch;
   a second diode coupled to the first diode;
   a first voltage divider coupled to the first diode, and coupled to the controller; and
   an AC input node.

6. The electronic device of claim 4, further comprising:
   a first switch coupled to the controller;
   an inductor coupled to the first switch;
   a diode coupled to the first switch;
   a capacitor coupled to the first switch;
   a first voltage divider coupled to the controller; and
   a second voltage divider coupled to the controller.

7. The electronic device of claim 1, wherein the frequency evaluator is further configured to determine the frequency based on an output voltage.

8. The electronic device of claim 1, wherein the output signal comprises a current, a voltage or a power.

9. The electronic device of claim 1, wherein the frequency evaluator comprises a look-up table.

10. The electronic device of claim 1, wherein the frequency evaluator is configured to calculate the correction factor based on a formula.

11. The electronic device of claim 10, wherein the frequency evaluator is further configured to calculate the correction factor based on a battery charging characteristic.

12. The electronic device of claim 1, wherein the controller further comprises an oscillator having a frequency control input coupled to the frequency evaluator.

13. The electronic device of claim 12, wherein the controller further comprises:
   a latch having a first input coupled to the oscillator and an output configured to:
      be coupled to a control node of the first switch; and
      determine a second switch control signal from a comparator output signal and an output of the oscillator;
   a comparator coupled to a second input of the latch; and
   a reference current signal generator coupled to the comparator, wherein the reference current signal generator is configured to determine the reference current signal based on a voltage input.

14. A method of controlling a power factor corrector, the method comprising determining a switching frequency of the power factor corrector, comprising:
   determining a load current; and
   assigning a switching frequency based on the load current comprising
      determining a correction factor in accordance with an output signal of the power factor corrector, and
      determining the switching frequency in accordance with the correction factor and a peak input current.

15. The method of claim 14, wherein a first switching frequency is lower than a second switching frequency and a first load current is higher than a second load current.

16. The method of claim 15, further comprising determining a load voltage, wherein assigning the switching frequency further comprises assigning the switching frequency based on the load voltage.

17. The method of claim 16, wherein a first switching frequency is lower than a second switching frequency and a first load voltage is lower than a second load voltage.

18. The method of claim 14, further comprising controlling a switch coupled to an inductor of the power factor corrector at the determined switching frequency.

19. A circuit comprising:
   a power factor corrector circuit comprising:
      a controller configured to produce a switching frequency in accordance with a battery charging curve, an estimator configured to determine a correction factor based on a signal of a DC output, the signal comprising a current, a voltage, or a power, and a frequency evaluator coupled to the estimator, the frequency evaluator configured to determine the switching frequency based on the correction factor and a peak input current;

an AC input coupled to the power factor corrector circuit; and the DC output coupled to the power factor corrector circuit.

20. The circuit of claim 19, the power factor corrector circuit further comprising:

a switch coupled to the controller;
an inductor coupled to the switch;
a capacitor coupled to the switch; and
a voltage divider coupled between the inductor and a ground node, wherein an output voltage of the voltage divider is coupled to an input of the controller.

21. The circuit of claim 19, wherein the controller further comprises:

an oscillator coupled to the frequency evaluator, and the oscillator is configured to provide an oscillator signal based on the frequency;

a latch having a first input coupled to the oscillator and an output configured to be coupled to a control node of a switch;

a comparator coupled to a second input of the latch; and a reference current signal generator coupled to the comparator, the reference current signal generator configured to determine the reference current based on a voltage input.

22. The circuit of claim 19, wherein the circuit is configured to charge a battery.

23. A method of controlling a power factor corrector, the method comprising determining a switching frequency of the power factor corrector, comprising:

determining a load current; and
assigning a switching frequency in accordance with the load current and a battery charging curve, wherein assigning the switching frequency further comprises
determining a correction factor in accordance with an output signal of the power factor corrector, and
determining the switching frequency in accordance with the correction factor and a peak input current.

24. The method of claim 23, further comprising setting a DC output in accordance with the switching frequency.

25. The method of claim 24, further comprising charging a battery with the DC output.

26. The method of claim 23, further comprising charging a battery in accordance with the switching frequency.

* * * * *